US012608332B2

(12) United States Patent
Bonsor-Matthews et al.

(10) Patent No.: US 12,608,332 B2
(45) Date of Patent: Apr. 21, 2026

(54) SYSTEMS AND METHODS FOR DIRECT DATA TRANSMISSION IN IMAGE PROCESSING SYSTEMS

(71) Applicant: Advanced Micro Devices, Inc., Santa Clara, CA (US)

(72) Inventors: Jonathan Philip Bonsor-Matthews, Milton Keynes (GB); Mark Thompson, Milton Keynes (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 152 days.

(21) Appl. No.: 18/395,486

(22) Filed: Dec. 23, 2023

(65) Prior Publication Data

US 2025/0209031 A1 Jun. 26, 2025

(51) Int. Cl.
*G06F 13/42* (2006.01)
*G06T 3/40* (2006.01)
*H04N 23/80* (2023.01)

(52) U.S. Cl.
CPC ................ *G06F 13/42* (2013.01); *G06T 3/40* (2013.01); *H04N 23/80* (2023.01)

(58) Field of Classification Search
CPC ............ G06F 13/42; G06T 3/40; H04N 23/80
USPC ........................................................ 710/105
See application file for complete search history.

(56) References Cited

U.S. PATENT DOCUMENTS

| | | | |
|---|---|---|---|
| 10,594,901 B2 | 3/2020 | Sines et al. | |
| 11,307,655 B2 | 4/2022 | Riguer et al. | |
| 2014/0376892 A1* | 12/2014 | Yamamoto | H04N 9/7921 |
| | | | 386/349 |
| 2017/0061567 A1 | 3/2017 | Lim et al. | |
| 2017/0337655 A1 | 11/2017 | Chua et al. | |
| 2021/0306592 A1* | 9/2021 | Kwon | H04N 19/31 |
| 2022/0179657 A1 | 6/2022 | Barry et al. | |

OTHER PUBLICATIONS

International Search Report and Written Opinion of International Application No. PCT/US2024/033404, mailed Oct. 2, 2024, 10 pp.

* cited by examiner

*Primary Examiner* — Christopher B Shin
(74) *Attorney, Agent, or Firm* — Kowert, Hood, Munyon, Rankin & Goetzel, P.C.; Rory D. Rankin

(57) ABSTRACT

Methods and systems for efficient data movement between various components in an image processing system are described. In a first mode, a dedicated data bus is configured for direct transmission of image data between the ISP core and the video core and/or display core. Using this bus, the video core and/or display core can request data from the ISP core. The ISP core transmits data to the video core and/or display core in response to the request. If the video core is unable to process incoming data from the ISP core at the rate at which data are generated by the ISP, it can apply back-pressure to the ISP core to pause transmission of data, e.g., by not consuming data transmitted from the ISP core. The data transmission is performed using a cache memory or buffer as an intermediatory, in a second mode.

20 Claims, 7 Drawing Sheets

SYSTEMS AND METHODS FOR DIRECT DATA TRANSMISSION IN IMAGE PROCESSING SYSTEMS

BACKGROUND

Description of the Related Art

Image processing systems often involve the manipulation and analysis of digital images for various applications, such as video conferencing, gaming, multimedia processing, etc. These systems require efficient memory management to handle substantial data sizes and computational demands associated with image processing tasks. Memory management in image processing involves allocation, utilization, and deallocation of memory resources within a processing unit or a distributed computing environment. Image data, being inherently large and complex, necessitates careful handling to ensure optimal performance, reduced latency, and effective utilization of computational resources.

Image processing algorithms typically involve multiple stages, such as pre-processing, feature extraction, filtering, analysis, and post-processing. Each of these stages requires access to different parts of the image data and intermediate results, often necessitating careful design and management of memory structures and data movement strategies. Conventional image processing systems utilize general-purpose memory management techniques, which may not be optimized for the specific requirements of image processing. For instance, in one implementation, an image processor, video core, and display core are implemented as distinct blocks connected to a common data fabric, or memory subsystem. In a typical video conferencing use case, a directly connected (e.g., MIPI Camera Serial Interface) camera sensor outputs data to a memory which is read into the image processor and outputted again to memory. This output data can be then read into the video core for compression or into the display core for display. The process of using the memory as an intermediary adds latency to the system and further consumes power.

Therefore, there exists a need for an improved memory management approach tailored to the demands of image processing systems.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for efficient data transmission between an image signal processing (ISP) core and a video or display core are described. In one implementation, a dedicated data bus is configured for direct transmission of image data between the ISP core and the video core. Using this bus, the video core can request data from the ISP core, e.g., using a data acquisition request. The ISP core transmits data to the video core in response to the request. If the video core is unable to process incoming data from the ISP core at the rate at which data are generated by the ISP, it can apply backpressure to the ISP core to pause transmission of data, e.g., by not consuming data transmitted from the ISP core. Alternatively, in order to apply backpressure, the video core transmits a stalling request to the ISP core to pause transmission of data, e.g., until a next data acquisition request or a specific period of time. Similar data transmission using dedicated data bus can also be performed between the ISP core and the display core.

Figure 1:
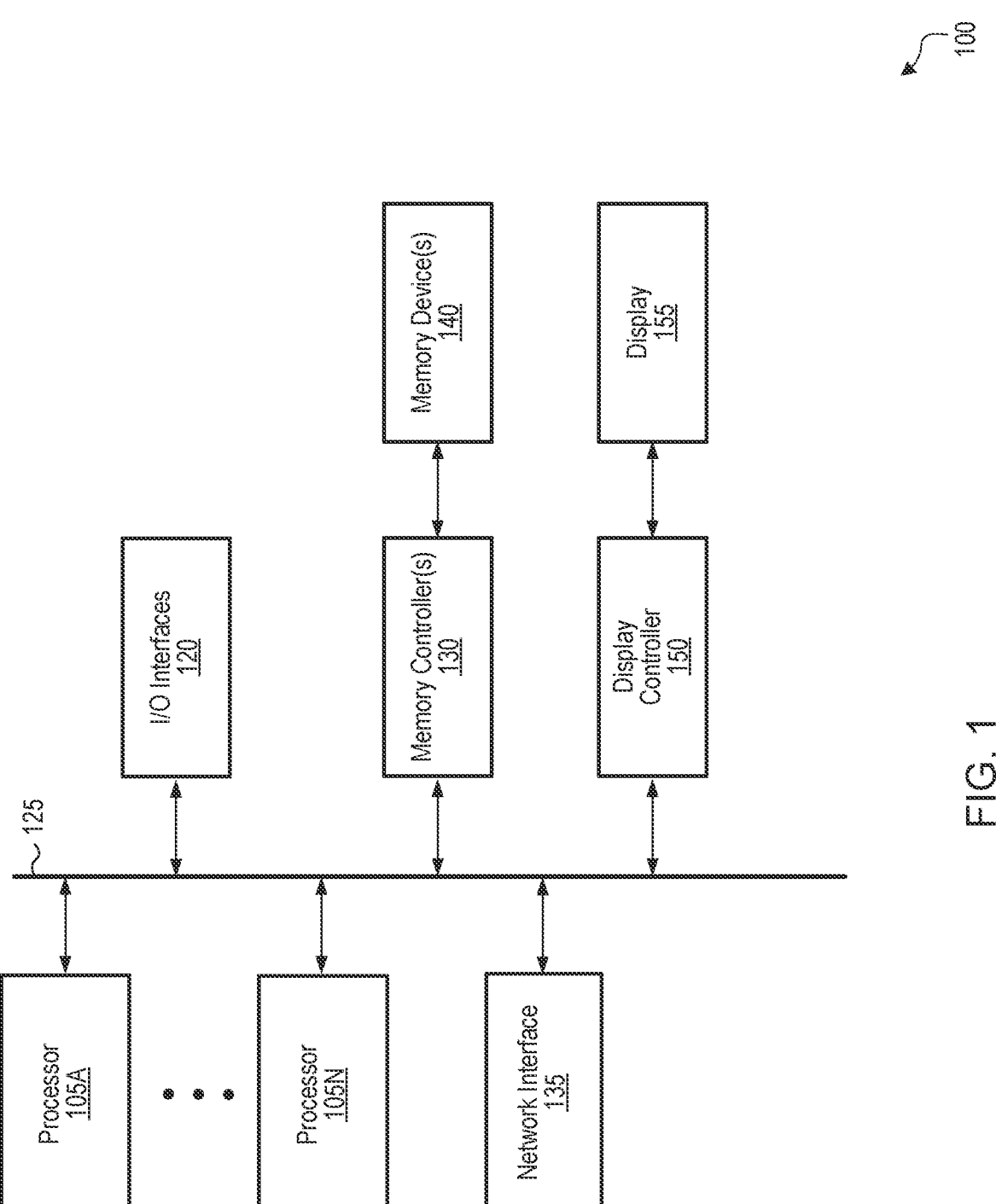
FIG. 1 is a block diagram of one implementation of a computing system.

Referring now to FIG. 1, a block diagram of one implementation of a computing system 100 is shown. In an implementation, computing system 100 is configured to, amongst other functionalities, process data, such that but not limiting to, unprocessed image data received from one or more imaging devices, such as a camera. The system 100 is configured to identify pixels in a raw image pattern and process the raw image pattern to create display-ready images. Additionally, the system 100 is configured to process data pertaining to static images and dynamic images (like videos) for a diverse range of camera-enabled devices, such as digital cameras, electronic devices with built-in digital cameras (e.g., mobile devices and laptop computers), security or video surveillance setups, medical imaging systems, and other devices operating in similar contexts. The processing of image data is explained in detail with respect to subsequent FIGS. 2-6.

In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100. In several implementations, one or more of processors 105A-N are configured to execute a plurality of instructions to perform functions as described with respect to FIGS. 4-6 herein.

In one implementation, processor 105A is a general-purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
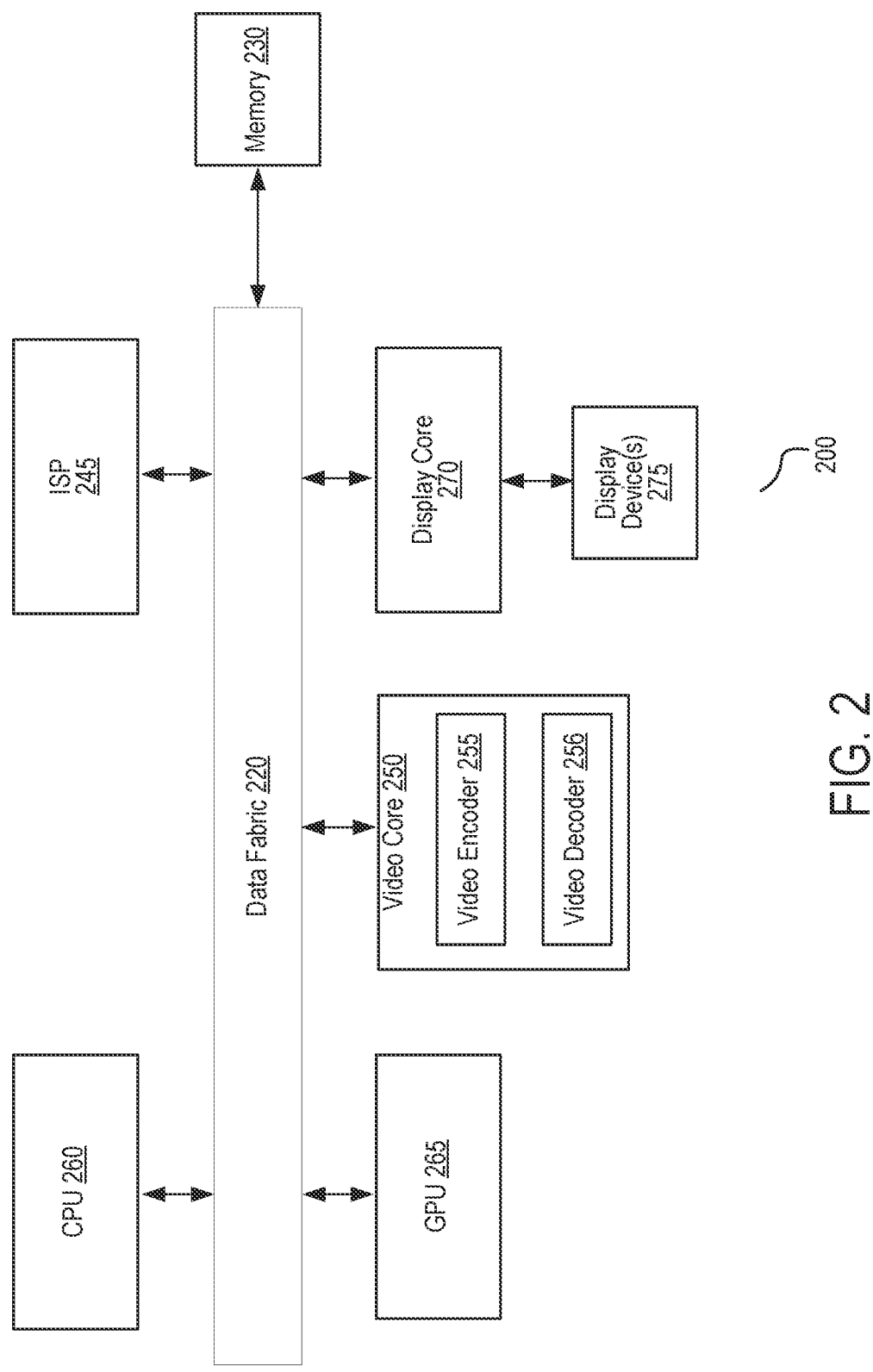
FIG. 2 illustrates the details of the computing system.

FIG. 2 illustrates an example computing system denoted as system 200. System 200 includes various components, including an Image Signal Processor (ISP) 245, one or more video cores (e.g., video core 250), a CPU 260, a GPU 265, a display core 270, and a memory 230. Additionally, the system 200 includes data fabric 220 that operates as a data bus, easing the movement of data to and from a system component to or from the memory 230, such as an external DRAMs. The video core 250 can at least include a video encoder 255, amongst other components not shown for the sake of brevity. Further one or more display devices 275 can receive display-ready data from the ISP 245 for presentation over graphical user interfaces (GUI).

As described hereinafter, the term "core" refers to a processing unit that comprises circuitry configured to perform tasks. In some cases, a core is dedicated to performing particular types of tasks. For example, a "video core" may be specifically designed to perform tasks related to processing video such as decoding streaming video, encoding video for applications like video conferencing, preparing video files for future playback, and similar operations related to video processing. Depending on the version, the video core can adopt specific hardware setups or structures specialized in video encoding and decoding. Further, a "display core" is designed to process tasks related to the display of images on a display device. In other cases, a core may be general purpose and may be configurable to perform different types of tasks. For example, central processing units typically have multiple cores that can be programmed to perform various tasks. In many cases, multiple cores are capable of operating on tasks simultaneously.

In one implementation, the system 200 serves as a high-level representation of a System on Chip (SoC) architecture, built upon Accelerated Processing Unit (APU) technology, designed for integration with camera-enabled devices. This architecture can support an operating system executing on the CPU 260 (e.g., an x86 CCX processor), responsible for rendering functions by the GPU 265, executing functionalities of the video core 250 and the display core 270, and overseeing ISP 245 functions.

The video core 250 is capable of encoding processed video, e.g., using video encoder 255, which can be transmitted back to a camera-enabled device, stored, or directed to other destinations. Moreover, the video core 250 can include a video decoder 256 that can possess the capability to decode video received from the camera-enabled device or other sources. The display core 270 is utilized to operate a display device 275, such as the one seen by a user of the camera-enabled device. Another approach involves the ISP 245 undertaking the majority of the processing within the system 200 when supplying computer vision services to the camera-enabled device. Consequently, efforts to minimize processing latency and enhance the user's experience are primarily directed at these components, as further elucidated below.

In conventional techniques of image processing, the ISP 245 is designed to gather image data from an input signal generated by an image sensor. An imaging device can include any device incorporating a camera with one or more lenses and image sensors. This comprehensive data are then assembled into a set of raw image data that can be processed by the ISP 245. The ISP 245 is equipped with a color filter array, like a Bayer filter, allowing it to capture both light intensity and wavelength information from each imaging pixel of the raw image data.

In an implementation, raw data generated from the imaging device are stored in memory 230, such that the ISP 245 can access this data from the memory 230, e.g., using a direct memory access (DMA) signal. For example, a sensor interface transmits the raw image data to the memory 230, which is stored in the memory 230 and forwarded to the ISP 245 for processing. The memory 230 is configured for DMA capabilities and could be a component of an external memory device or a distinct dedicated memory within the system 200.

Upon reception of the raw image data, from the memory 230, the ISP 245 executes various image processing tasks like Bayer transformation, demosaicing, noise reduction, image sharpening, temporal filtering, binning compensation filtering, and the like, using the raw image data. In an implementation, ISP 245 is configured to perform various analysis using the raw image data, e.g., for object detection and sharpness estimation. In another implementation, ISP 245 can further provide feedback, associated with the raw image data, to the image sensors. For example, the feedback can pertain to improve auto-focus capabilities of the camera-enabled device. The ISP 245 can further carry out processing of the image data in its raw form as well as in a specific color space, e.g., RGB and YCBCR color spaces. It is noted that the above description lists a few examples of processing functions of ISP 245, and other functionalities are possible. In one implementation, ISP 245 includes various processing components, such as a scaler, to perform one or more functionalities when processing raw image data. In one example, a scaler can be configured to resize a digital image or magnify digital image data, i.e., upscaling or resolution enhancement. These functionalities are contemplated.

Following processing of the raw image data by ISP 245, the processed image data are transmitted to the memory 230, from where it can be accessed by the video core 250 or the display core 270. For example, in certain setups, the output of the ISP 245 is directed to an encoding engine (via the video core 250) for image data encoding. In order to access data from the memory 230, the video core 250 must issue another DMA request to the memory 230. Once the encoding process is complete, the encoded image data could again be stored in the memory 230 to be displayed on a display device (via a display core 270).

As described above, during the image processing procedure, multiple DMA signals must be issued to the memory 230, in order to facilitate image data (at various stages of processing) to multiple computing components of the system 230. This results in latencies due to delay or waiting time experienced during data transfers between these components. Further, DMA requests often involve continuous or frequent data transfers, especially in high-throughput applications like video processing, thereby consuming additional power on the data fabric 220, by keeping the data fabric 220 activated for extended periods. This in turn increases the overall power consumption of the system 200.

To reduce latencies and manage power consumption efficiently, methods and systems described herein make use of dedicated data buses to transfer data between different components of the system 200. In one implementation, a dedicated data bus can be configured for data transfer between the ISP 245 and the video core 250. The dedicated data bus is also configured for data transfer between the ISP 245 and the display core 270. Ordinarily, for data transmission during image processing, a first computing component (e.g., ISP 245) would store data to memory (memory 230) and a second computing component (e.g., video core 250) would have to retrieve the data from the memory. This would entail issuance of DMA requests both during storage and retrieval of data and therefore increase latencies in the system. In order to avoid the latencies associated with such an approach, a data bus (referred to as a "dedicated data bus" herein) is coupled between the components such that the first component can transmit data directly to the second component without using the memory as an intermediary. In doing so, latencies experienced during data transfers are reduced. Further, power consumption is greatly reduced in cases where the output of the ISP 245 can be directly transmitted to the video core 250 or the display core 270 using the dedicated data bus. This could be especially beneficial in cases where video processing or camera-based applications execute on battery powered devices. These and other implementations are described in further detail with respect to FIGS. 4-6.

Figure 3:
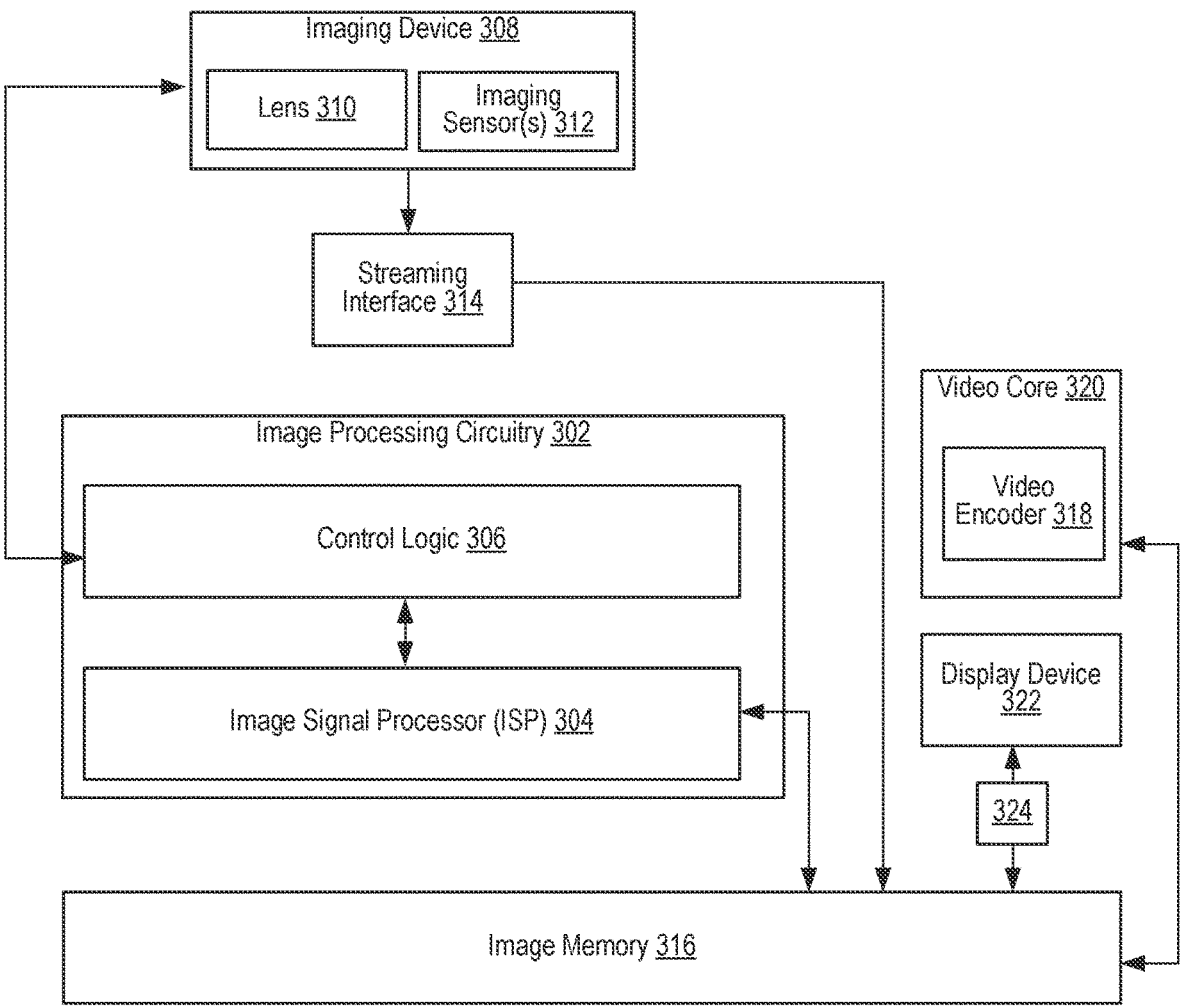
FIG. 3 illustrates an example block diagram depicting a conventional image processing procedure.

FIG. 3 illustrates an example block diagram depicting a conventional image processing procedure. As shown, the circuitry for image processing, denoted as image processing circuitry 302, includes the image signal processor (ISP) 304 and control logic 306. The image data initially captured by an imaging device 308 undergoes processing by the ISP 304. Specifically, the ISP 304 is designed to collect image data from an image sensor input signal. As illustrated, the imaging device 308 (e.g., a camera) includes one or more lenses, e.g., lens 310 and one or more image sensor(s) 312. As mentioned earlier, these image sensor(s) 312 can incorporate a color filter array like a Bayer filter, allowing capture of both light intensity and wavelength information from each imaging pixel. The data from the image sensor(s) 312 is captured by a streaming interface 314 which stores the raw image data to an image memory 316 (or "memory 316"). In one example, the streaming interface is a Standard Mobile Imaging Architecture (SMIA) interface, Mobile Industry Processor Interface (MIPI), or a combination thereof.

The control logic 306 is equipped with a processor and/or microcontroller designed to execute one or more routines, like firmware. These routines are set up to analyze the provided image data, resulting in the determination of control parameters for the imaging device 308 and the ISP 304. To provide an example, control parameters could encompass parameters related to sensor control (e.g., gains, integration time for exposure control), camera flash control, and lens control (e.g., focal length for focusing or zoom), either individually or in combination. On the other hand, ISP control parameters can involve parameters such as gain levels, color correction matrix (CCM) coefficients for auto-white balance and color adjustment (e.g., during RGB processing), and lens shading correction parameters.

In operation, the ISP 304 receives unprocessed image data from the memory 316, i.e., data that is transmitted from the streaming interface 314 to the memory 316. Subsequently, the unprocessed image data are processed by the ISP 304 by executing various image processing tasks as described in the foregoing. Following this, the processed image data are again transmitted to the memory 316, e.g., by issuance of a DMA request by the ISP 304. This processed data are stored in the memory 316 and outputted to a video encoder 318, through a video core 320. Alternatively, or additionally, the processed data can also be outputted to a display device 322, through a display core 324. For example, in a video conferencing application, camera data can be encoded and directly displayed to a display device.

The image data, post-processing by the ISP 304, can be presented on the display device 322 for user viewing or could undergo further processing by a graphics engine or GPU. For presentation of the processed data on the display device 322, the output from the ISP 304 is stored to memory 316, and the display core 324 can read the data from the memory 316. Furthermore, in certain setups, the output from the ISP 304 can be directed to the video encoder 318 for image data encoding. In such implementations, the output from the ISP 304 is stored to memory 316, and the video core 320 can read the data from the memory 316. The output data are then encoded and the encoded data can be again stored in the memory 316. This encoded data can be directly displayed on the display device 322. In some examples, the video encoder 318 can be a JPEG compression engine for encoding still images, or an H.264 compression engine for encoding video images, or a combination of these, along with a corresponding decompression engine for decoding the image data. In other examples, the video encoder 318 can also function in video codec formats such as VP9, H.265, AV1, DNX or other video codecs.

As shown in the figure, for transmitting processed data from the memory 316 to the video core 320, a DMA request is either issued by the ISP 304 to the memory 316 or by the video core 320 to the memory 316, depending on specific application implementations. Similarly, for transmitting processed data from the memory 316 to the display core 324, another DMA request is issued by the ISP 304 or the display core 324 to the memory 316. That is, each time data (unprocessed or processed) need to move between the ISP 304 and any one of the video core 320 or the display core 324, separate DMA request are to be generated to facilitate data transmission. These DMA requests can result in delays or waiting times experienced during data transfers between the ISP 304 and the video core 320 or the display core 324. Further, high traffic on the system buses or DMA channels (e.g., data fabric 220 of FIG. 2) can result in delays for DMA requests as the DMA controller competes for bandwidth with other devices. Specifically, for applications involving video or image processing in real-time, latencies due to DMA controller efficiency, bus traffic, and overall DMA request handling can disrupt seamless processing.

Figure 4:
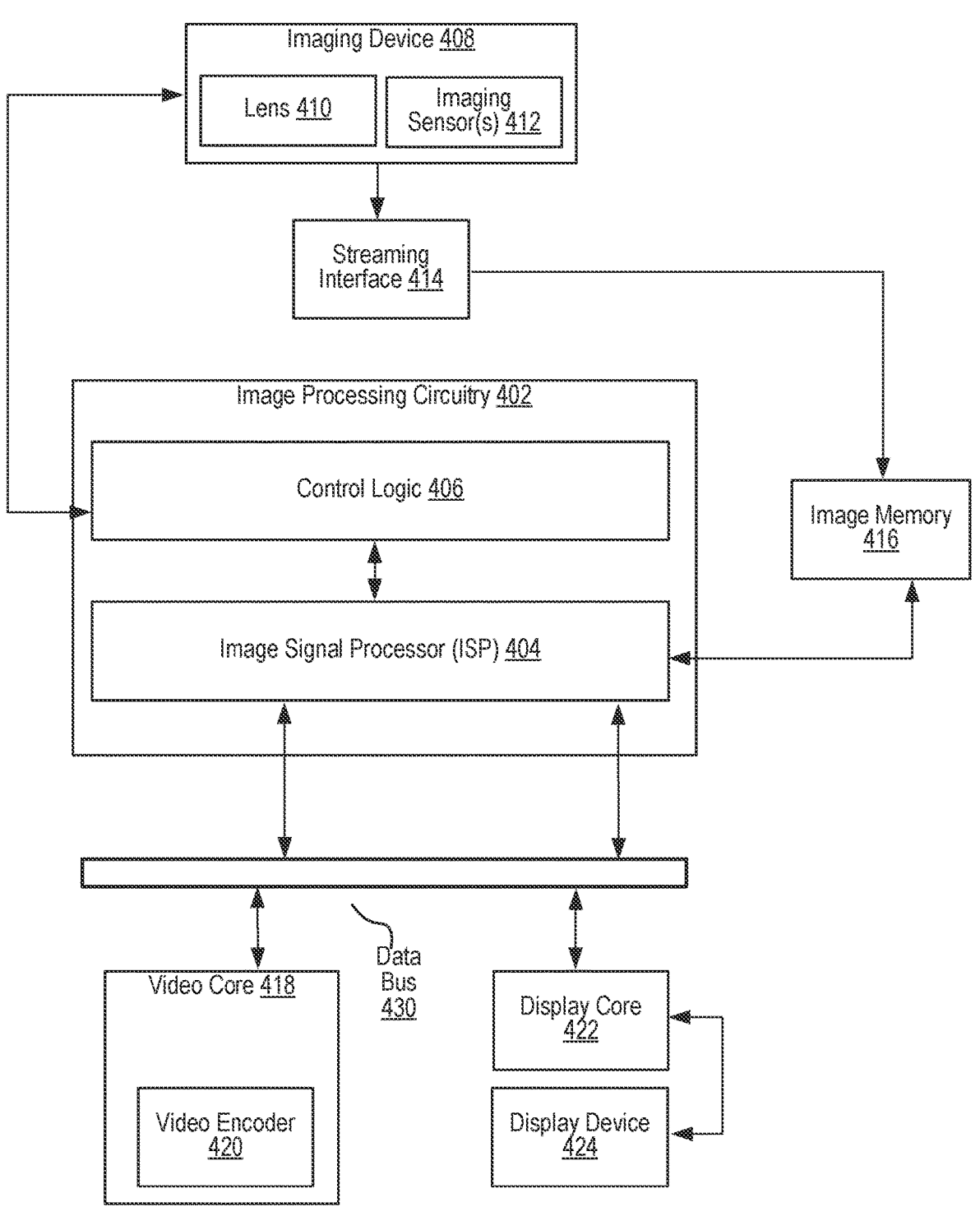
FIG. 4 is an example block diagram depicting data transmission using dedicated data buses during an image processing procedure.

Turning now to FIG. 4, an example block diagram depicting data transmission using dedicated data buses during an image processing procedure is described. It is noted that components of the block diagram of FIG. 4 have similar functionalities to respective components described in FIG. 3, unless otherwise indicated.

FIG. 4 depicts image processing circuitry 402 including one or more image signal processors (e.g., ISP 404) and control logic 406. In an implementation, image data initially captured by an imaging device 408 is processed by the image processing circuitry to produce processed data that can be displayed, and/or further processed by another processing component such as a GPU. As described herein, "image data" refers to digital or analog information representing visual content captured or generated by an imaging device, such as a camera, scanner, or other image-capturing equipment. These data can include pixel values, color information, metadata, and other relevant information that collectively form a digital representation of an image. Image data are used herein to describe electronic or digital form of visual information that can be processed, stored, transmitted, and displayed by electronic devices or systems, as related to imaging technologies, devices, or applications.

In an implementation, the ISP 404 is designed to collect image data from an image sensor input signal. As illustrated, the imaging device 408 includes one or more lenses (e.g., lens 410) and image sensor(s) 412. The image sensor(s) 412 can incorporate a color filter array like a Bayer filter, allowing capture of both light intensity and wavelength information from each imaging pixel. The unprocessed image data from the image sensor(s) 412 are captured by a streaming interface 414, which stores these data to an image memory 416 (or "memory 416").

In an implementation, the unprocessed image data undergo processing by the ISP 404. Specifically, the ISP 404 is designated to execute one or more functions to process the unprocessed image data. For example, the ISP 404 can perform a demosaicing process by reconstructing a full-color image from the color-filtered data (e.g., Bayer pattern) captured by the image sensor 412. The ISP 404 can further perform color correction for the image data by adjusting the color balance and correcting any color inaccuracies in the image. This can involve adjusting the color temperature, hues, and saturation levels to achieve a more accurate representation of the scene. Other operations can include white balance adjustment, noise reduction, image sharpening, gamma correction, lens shading correction, range adjustment, and the like.

In one implementation, the processed data from the ISP 404 can be output to a video core 418, e.g., to be processed by a video encoder 420. As shown, the data from the ISP 404 is transmitted directly to the video core 418, using a dedicated data bus 430, instead of using the memory 416 as an intermediary. In this implementation, a "dedicated data bus" refers to a specialized pathway or channel within a computing device architecture, that is designated for the transmission of data directly between the ISP 404 and the video core 418, without using image memory 416 as an intermediary. This data bus 430 is specifically intended and allocated for communication between the ISP 404 and the video core 418, ensuring focused and efficient data transfer without interference from memory 416. As used herein, the "dedicated" aspect signifies the purpose of this data bus 430, emphasizing its specific function in facilitating data exchanges between predefined elements of the system, as outlined in this specific implementation.

In one implementation, data transmission between various components shown in the figure can be performed in two distinct modes. In a first mode of operation, data can be directly transmitted between two components, e.g., ISP 404 and video core 418 using a dedicated data bus, such as data bus 430. In a second mode of operation, data can be transmitted using memory 416 as an intermediary, e.g., the ISP 404 can transmit the data to the memory 416 and the video core 418 can access the data from the memory 416, using one or more DMA signals. In one implementation, if significant processing is desirable for a given application, i.e., if the data processed by the ISP 404 is to be further processed by a GPU before being encoded or displayed, the data can be transmitted using memory 416 (e.g., through a data fabric, as described in FIG. 2). In other instances, the data can be directly transmitted between the ISP 404 and the video core 418 or display core 422 using dedicated data bus 430.

In one example, the data bus 430 is configured in a manner that an output path of the ISP 404 connects directly to an input channel of the video core 418, through the data bus 430. In operation, the ISP 404 uses an output scaler (not shown) to scale the image data by adjusting the size of the image and increasing (upscaling) or reducing (downscaling) the image's dimensions. Further, in cases where the scaled image is to be encoded by the video encoder 420, the data for the scaled image can be directly transmitted from the ISP 404 to the video core 418 using the data bus 430.

In an implementation, the data from the output scaler of the ISP 404 are transmitted to the video core 418, e.g., continuously, as the data are generated at the ISP 404. In one example, a valid and ready handshake connection between the video core 418 and the ISP 404 can be used to transmit data between the devices. In an alternative implementation, the data are transmitted from the ISP 404 to the video core 418 in response to a data acquisition request from the video core 418. That is, the ISP 404 continues processing unprocessed image data received from the streaming interface 414, and only transmits these data to the video core 418 when the video core 418 requests for the data. For example, in cases where the throughput of the video core 418 is less than the throughput of output data from the ISP 404, the video core 418 can apply backpressure to the ISP 404, in order to pause data transmission from the ISP 404 to the video core 418. For example, if the video core 418 is unable to process data at the rate at which the data are outputted from the ISP 404, the video core can apply backpressure to the ISP 404. The backpressure results in the ISP 404 pausing the transmission of the output data to the video core 418.

In one implementation, the backpressure can be applied in the form of a "stalling request" transmitted to the ISP 404, e.g., using the data bus 430. Responsive to the backpressure from the video core 418, the ISP 404 pauses transmission of data to the video core 418. In such situations, the video core

418 can efficiently manage its workload before more data from the ISP 404 are received. Further, until a time in the processing that the video core 418 is able to process more data (or in one example, a new data acquisition request is received from the video core 418), the transmission remains paused. When the backpressure is lifted, the transmission can restart over the data bus 430. This way, real-time performance constraints for the ISP 404 are reduced and the ISP 404 is also enabled to take backpressure from the video core 418.

In an implementation, the data bus 430 is also configured to continuously transmit the processed data (e.g., scaler output data) directly from the ISP 404 to the display core 422, e.g., to generate display-ready data for a display device 424. Similar to the description above, the data bus 430 also transmits data and data requests between the ISP 404 and the display core 422 directly, i.e., without invoking the image memory 416 as an intermediary. For example, data can be transmitted directly to the display core 422, in situations wherein data are ready to be displayed to the display device 424, without first compressing or decompressing the data by the video core 418. Further, the display core 422 can also apply backpressure to the ISP 404 in order to pause data transmission from the ISP 404 to the display core 422, e.g., when the display core 422 cannot process data at the rate at which the data are outputted from the ISP 404. In one implementation, the display core 422 governs the data rate, i.e., data rate for the display core 422 is faster than both the video core 418 as well as the imaging devices (or paced with the imaging devices), so as to ensure that the display core 422 can apply backpressure to the ISP 404.

In one implementation, as described above for video core 418, the display core 422 can also request the processed data from the ISP 404 using data acquisition requests. Further, the display core 422 is also configured to transmit a stalling request to request pausing of the transmission of data from the ISP 404 to the display core 422. In one example, the data transmission remains paused until the backpressure is lifted or a next data acquisition request is received by the ISP 404 from the display core 422. In one implementation, responsive to the backpressure from the display core 422 or the video core 418, the ISP 404 can further pause scaling of image data. This can be done to ensure that the ISP 404 is not unnecessarily burdened with scaling workload, at the time when the display core 422 or video core 418 are unable to process incoming data from the ISP 404.

In one or more implementations, the ISP 404 continues to request unprocessed image data, until it is back-pressured by its own processing. Further, in parallel, the ISP 404 will process the image data, until the ISP 404 is back-pressured by its output transmission (i.e., transmission of output data). Furthermore, in parallel, the ISP 404 will continue transmitting output data, until it is back-pressured by either or both of the video core 418 and/or the display core 422.

As described herein, a "data acquisition request" refers to a signal initiated by a system or component of a system to obtain specific data from a source or provider. This request is made in a structured format, specifying the data type, format, and other relevant parameters necessary to retrieve the desired information. Further, "stalling request" is a special format request sent by a system or a component of a system to pause transmission of incoming data from the source or provider.

In an implementation, for configuring the dedicated data bus 430, an order of the output of the ISP 404 is the same as an input order of the video encoder 420 and the display device 424. For example, the order can be associated with a line order, i.e., applicable to whole lines (rows of pixels in an image), rather than individual pixels or blocks. In another example, the display device 424 generating output that is flipped left-to-right (mirror image) can also utilize the dedicated data bus 430, as the line output of ISP 404 and input of display device 424 are still in the same order. In yet another example, the video encoder 420 can also request output from the ISP 404 in a tiled format, e.g., by using matching sizes for codec blocks.

FIG. 4 is described with reference to a single data bus 430 for direct data transfer between the ISP 404 and the video core 418 and/or the display core 422 without invoking image memory 416. In this case, the dedicated bus 430 is shared by the video core 418 and the display core 422. However, in other implementations, each of the video core 418 and display core 422 may have its own dedicated bus. For instance, a first data bus can be configured for direct data transfer between the ISP 404 and the video core 418. Similarly, a second separate data bus can be configured for direct data transfer between the ISP 404 and the display core 422. Further, other dedicated data buses (not shown) can also be configured for other processes executed by the image processing circuitry 402. For instance, another dedicated bus (e.g., to an image processing unit or inference processing unit) can be configured, when other compute processes are required as an intermediate step. These can include use of an image processing unit to control auto-focus or detect location of people in an image. In alternative implementations, these controls are internally built in the ISP 404. Other implementations are contemplated.

In various implementations, using dedicated data buses as described above, can reduce latency and power consumption in cases where the ISP 404 output can be directly transmitted to the video core 418 and/or the display core 422. This can provide significant power savings compared to situations where each intermediate connection requires a write to and a read from memory 416 and/or a system cache.

In one implementation, some graphic devices can allow the display core 422 to read from buffers in the global cache (e.g., a global data share or cache integrated in a data fabric) without invoking an external memory (e.g., Graphics Double Data Rate memory). In this implementation, the ISP 404 can write into the global cache and the video core 418 or the display core 422 can read from this cache, to achieve some of the power gains of the implementations described above, but without adding dedicated buses. When reading directly from buffers in the global cache, latency reductions can be provided, e.g., by using the global data share for sub-frame-level synchronizations.

Figure 5:
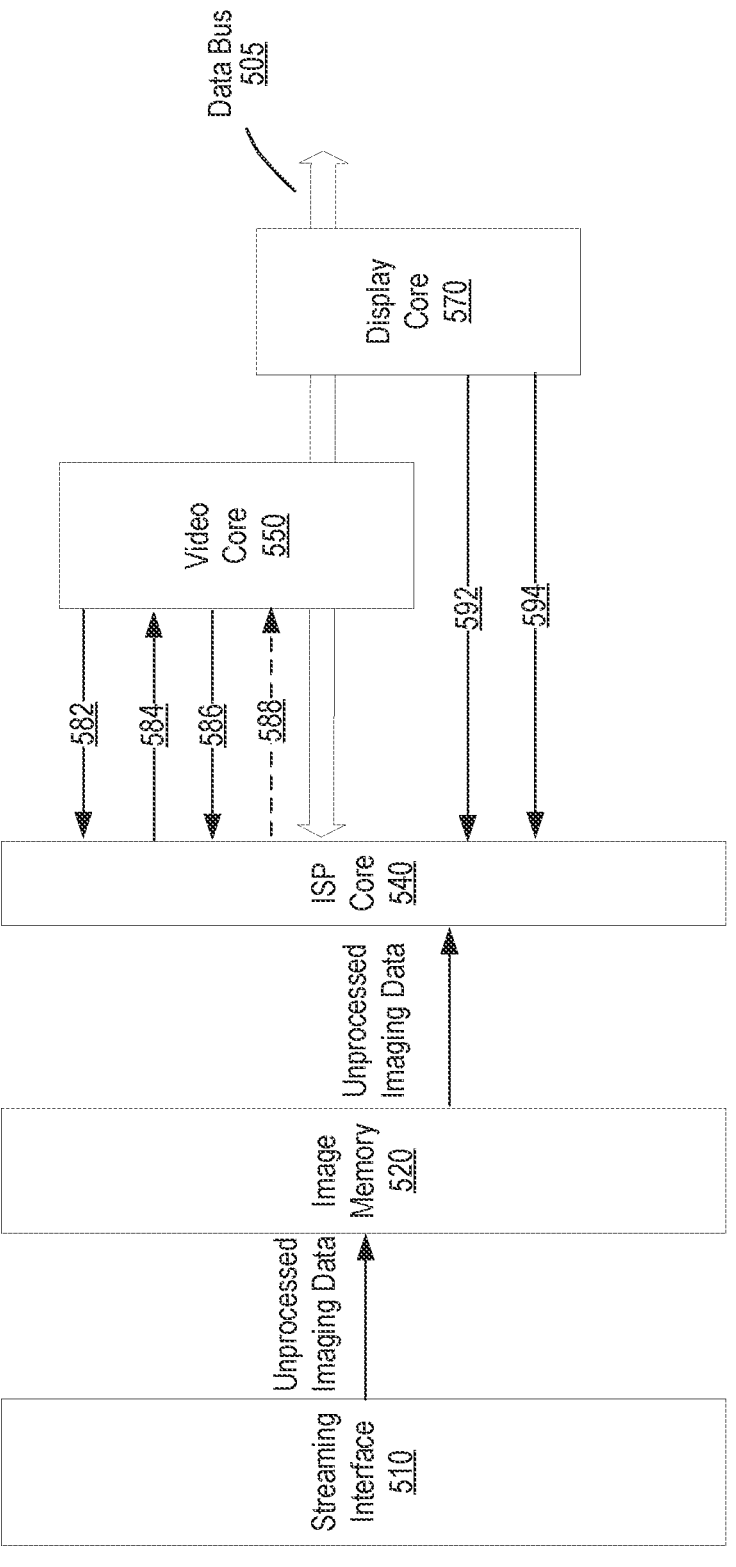
FIG. 5 illustrates an example communication flow diagram depicting movement of data between various components during an image processing procedure.

FIG. 5 illustrates an example communication flow diagram depicting movement of data between various components during an image processing procedure. As shown, unprocessed image data generated by an imaging device (e.g., imaging device 408 described in FIG. 4) are stored at an image memory 520, by a streaming interface 510. The unprocessed image data, in one example, include raw image data that are directly outputted from an image sensor or a camera without undergoing any significant processing or manipulation. The unprocessed image data represent information captured by the image sensor and can include a mosaic of pixel values, each corresponding to a specific color channel or intensity level.

In an implementation, the unprocessed image data are temporarily stored in the image memory 520, as pixel data augmented with color information, resolution and size information, and image format information. At the time of processing the image data, the ISP core 540 can access these data from the image memory 520, e.g., through a DMA request. The ISP core 540, using its various internal components, is configured to process the data in their raw form as well as in specific color spaces, e.g., RGB and YCBCR color spaces. The image data, post-processed by the ISP core 540, can be presented on a display device for user viewing or could undergo further processing by a graphics engine or GPU.

In one implementation, when encoding the processed image is required, a video core 550 is configured to send a data acquisition request 582 to the ISP core 540. The data acquisition request is transmitted to the ISP core 540 using a dedicated data bus 505. Responsive to the data acquisition request, the ISP core 540 is configured to transmit processed image data (e.g., scaled image data 584) to the video core 550. The video core 550 can further process the scaled image data 584, e.g., encode the data using a video encoder to generate encoded image data.

In some instances, the video core 550 is unable to process data received from the ISP core 540 at the rate at which the ISP core 540 transmits data. In such a situation, the video core 550 is configured to generate and transmit a stalling request 586 back to the ISP core 540 to pause transmission of the data from the ISP core 540. In response to receiving the stalling request 586, the ISP core 540 pauses the transmission (588) of data, until the next data acquisition request is received from the video core 550. In an implementation, the stalling request 586 can also be transmitted using the dedicated data bus 505, as shown.

In one implementation, the ISP core 540 can also process unprocessed image data to generate display-ready data. For example, a display core 570 can request display-ready data from the ISP core 540, by issuing a data acquisition request 592. The data acquisition request 592 can be transmitted by the display core 570 using the dedicated bus 505. Responsive to the data acquisition request 592, the ISP core 540 transmits display-ready data 594 to the display core 570. In an implementation, the display core 570 can also be configured to generate and transmit a stalling request back to the ISP core 540, to pause transmission of the new display-ready data from the ISP core 540. In response to receiving the stalling request, the ISP core 540 pauses transmission of such data, until a next data acquisition request is received from the display core 570. The display-ready data can be presented to a user over a display device.

In one or more implementations, backpressure from the video core 550 could cause data transmission from the ISP core 540 to the display core 570 to be stalled. Similarly, backpressure from the display core 570 could also cause data transmission from the ISP core 540 to the video core 550 to be stalled. In such cases, the ISP core 540 only processes the data once and sends the data simultaneously to both the video core 550 and displays core 570, as and when the data become ready. It is noted that although FIG. 5 shows a single video core 550 and display core 570 for the sake of simplicity, data transfer can be performed between multiple ISP cores and video cores (as well as display cores) using dedicated data buses.

In the example implementation shown in FIG. 5, the movement of data as well as the pauses in the transmission of data between different processing devices is shown to be performed in response to specific data requests (data acquisition and stalling requests). However, in alternative implementations, data movement (and pausing of data) can also occur simply based on handshake connections between the devices. For instance, a valid handshake is configured between ISP 540 and the video core 550 to transmit data from the ISP 540 to the video core 550, over the bus 505. Further, if a backpressure is applied by the video core 550 to the ISP 540, the handshake connection can be terminated so as to pause transmission of data from the ISP 540 to the video core 550. Similar connections for can also be configured between the ISP 540 and display core 570. Such implementations are not precluded from the present disclosure.

Figure 6:
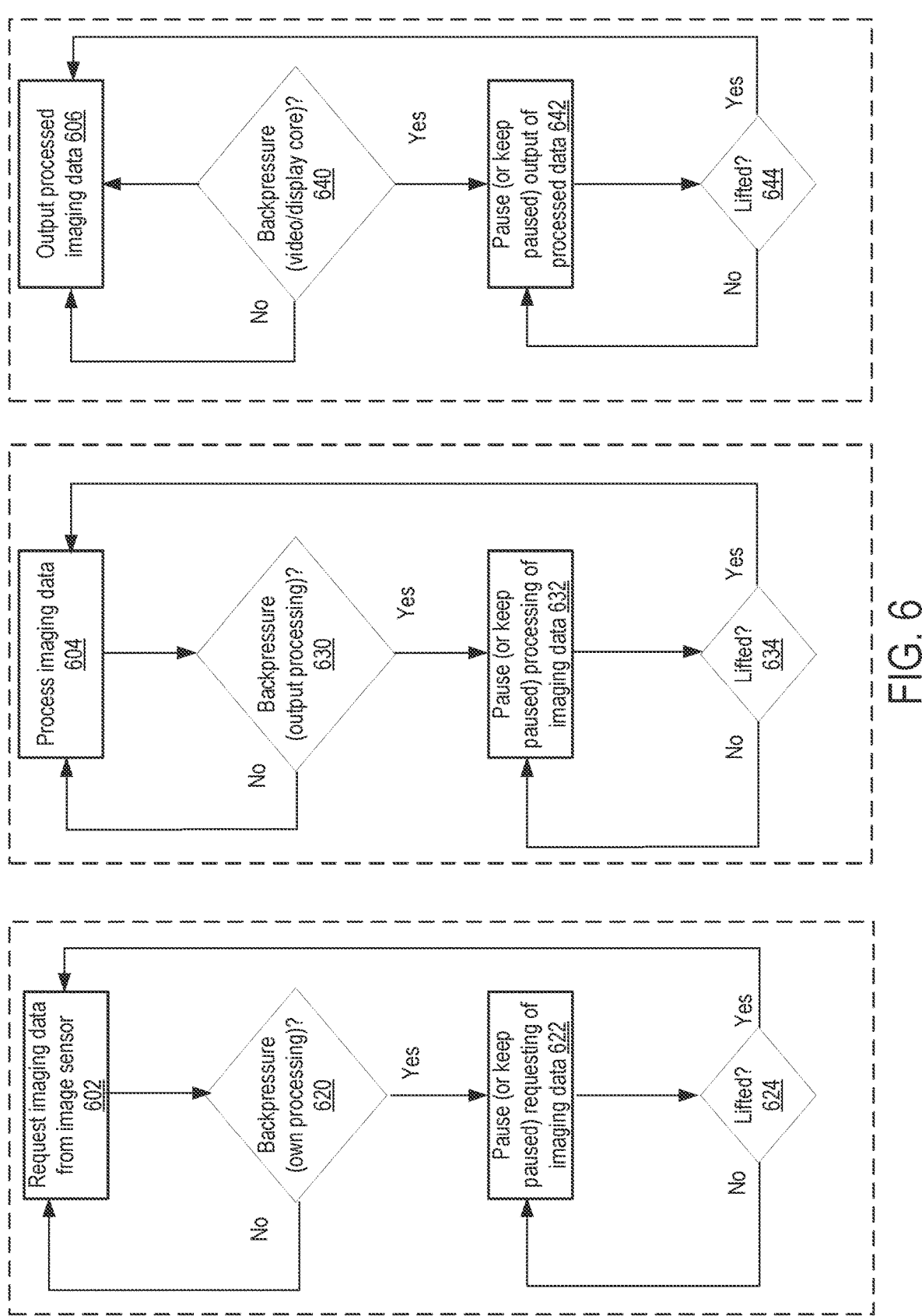
FIG. 6 illustrates an example method for using dedicated data buses for data transmission in an image processing procedure.

Turning now to FIG. 6, an example method for using dedicated data buses for data transmission in an image processing procedure, is described. In various implementations, one or more processes including requesting of imaging data, processing of imaging data, and outputting of processed data (blocks 602, 604, and 606, respectively) are executed in a pipelined manner, e.g., till a backpressure condition is experienced in the pipeline (as described below). In such implementations, the processes that experience backpressure are stalled, and, once the backpressure condition is no longer present, these processes can resume. The parallel nature of the processes depicted by blocks 602, 604, and 606 are denoted using dotted enclosures.

As depicted in the figure, raw or unprocessed imaging data are requested for processing by an image processing circuitry (block 602). In an implementation, the unprocessed imaging data are stored in a memory or cache buffer accessible by the image processing circuitry. The image processing circuitry includes an image signal processor (ISP) to process the unprocessed image data. As described above, the ISP is configured to continuously process the unprocessed image data (as shown in block 604) by executing various image processing tasks as described in the foregoing. At the same time, the ISP is also configured to simultaneously output processed imaging data (block 604), as and when their data are ready. In other words, when new data are currently received by the ISP, previously received data are simultaneously being processed and outputted by the ISP to various components of the graphics pipeline (e.g., video core and/or display core).

In an implementation, at any time while the data are being received by the image processing circuitry, the ISP can experience backpressure, e.g., when the ISP is unable to process the imaging data at the rate it is receiving the data from the memory. If such a backpressure is experienced (conditional block 620, "yes" leg), the image processing circuitry pauses requesting of the imaging data from its source (block 622), e.g., one or more imaging devices. The image processing circuitry can then periodically determine whether the backpressure is lifted (conditional block 624). When there is no more backpressure (conditional block 624, "yes" leg), the image processing circuitry can continue to request imaging data, as shown in block 602. Otherwise, the requesting of image data remains paused. Similarly, if no backpressure is experienced (conditional block 620, "no" leg), the ISP continues to request new imaging data from the image sensor, as shown in block 602.

In one implementation, the ISP can further experience backpressure due to its output processing. That is, backpressure can be experienced by the ISP as a result of the rate of outputting processed data being less than a rate of the imaging data being processed by the ISP. If such backpressure is experienced (conditional block 630, "yes" leg), the ISP pauses further processing of imaging data, till the backpressure is lifted. Once the backpressure is lifted (conditional block 634, "yes" leg), the ISP restarts processing the imaging data (as shown in block 604). Alternatively, till the backpressure is not lifted (conditional block 634, "no" leg), the processing of imaging data remains paused (block 632).

Again, if no backpressure is experienced by ISP due to its output processing (conditional block 630, "no" leg), the requested imaging data continue to be processed by the ISP.

As described in the foregoing implementations, the processed imaging data are outputted to a video core and/or display core (block 606). In one implementation, the processed imaging data can be outputted to the video or display core in response to a data acquisition request received from the video or display core, requesting processed data from the ISP. In one example, the data acquisition requests can be received at a dedicated data bus configured between the ISP and the video core and the display core. The dedicated data bus is configured to facilitate direct data transfer between ISP and video or display core, without the intervention of the image memory as an intermediary.

In an implementation, the ISP can also experience backpressure from either the video core and/or the display core, during outputting of the processed imaging data to the video core and/or the display core. For example, if the rate of transmitting processed data from the ISP to a video core is greater than a processing rate of the video core, the video core can apply backpressure to the ISP. In this implementation, if such backpressure is experienced (conditional block 640, "yes" leg), the ISP pauses the output of processed data (block 642), till the backpressure is lifted. Once the backpressure is lifted (conditional block 644, "yes" leg), the outputting of processed imaging data resumes (as shown in block 606). Till the backpressure is not lifted (conditional block 644, "yes" leg), the transmission of output data remains paused (as shown in block 642). Again, the transmission of processed imaging data from the ISP to the requesting components continues (block 606), if no backpressure is received from either the video core or the display core (conditional block 640, "no" leg).

In one implementation, the backpressure from a video core (or display core) is a result of a stalling request issued by the video core. In response to receiving such a stalling request, the ISP is configured to pause transmission of data to the requesting circuitry (video core and/or display core), e.g., until a next data acquisition request is received. In one implementation, the stalling request can be transmitted to the ISP by a requesting circuitry, using the dedicated data bus described above. Once the next data acquisition request is received, the data transmission can resume.

In an implementation, transmission of processed imaging data from the ISP to the video core and/or the display core is performed using one of two modes. In the first mode, imaging data are requested, e.g., by the video core from the ISP, using a dedicated bus programmed between these components. Further, requested data are transmitted directly from the ISP to the video core over the dedicated data bus. In another implementation, in the second mode of operation, data requested are accessed through a memory (e.g., image memory 416 of FIG. 4) instead of the dedicated data bus. In one example, the second mode of operation can be used when processing is required on the image data (e.g., the GPU needs to access and process the image data before passing it onto the video core or the display core). The image processing circuitry can switch between these modes based on various applications.

Figure 7:
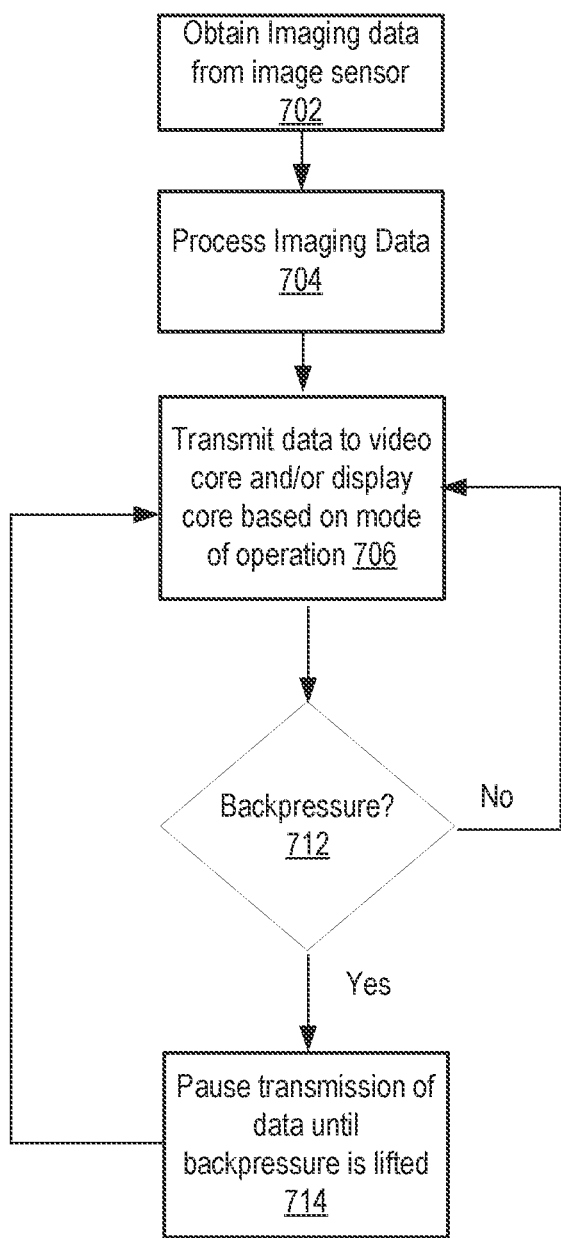
FIG. 7 illustrates an example method for using dedicated data buses for data transmission in an image processing procedure.

Turning now to FIG. 7, an example method for data transmission in an image processing system, is described. Raw imaging data is obtained by an image processing circuitry for further processing (block 702). In an implementation, the unprocessed image data is stored in a memory or cache buffer accessible by the image processing circuitry. The image processing circuitry at least includes an image signal processor (ISP) to process unprocessed image data. The ISP is configured to process the unprocessed image data (block 704) by executing various image processing tasks like temporal filtering, binning compensation filtering, and the like.

In an implementation, the ISP transmits the processed imaging data to a video core and/or a display core using one of two modes of operation (block 706). In the first mode of operation, the ISP performs a direct data transfer, i.e., transmits the processed imaging data to the video core or display core using a dedicated data bus, without invoking an imaging memory as an intermediary. As described in the foregoing, individual dedicated buses can be configured between the ISP and the video core as well as ISP and the display core. In another implementation, a single dedicated data bus can be configured for data transmission from the ISP to the video core and the display core. In the second mode of operation, data requested is accessed through a memory (e.g., image memory 416 of FIG. 4) instead of the dedicated data bus. In one example, the second mode of operation can be used when intensive processing is required on the image data (e.g., the GPU needs to access and process the image data before passing it onto the video core or the display core). The image processing circuitry can switch between these modes based on various applications.

In one implementation, the ISP transmits the processed data in response to a determination that a data acquisition request is received from a video core, requesting processed data from the ISP for further processing, such as compression or encoding. In another implementation, the data acquisition request can also be received from a display core to request display-ready data for presentation on a display device. The data acquisition request can be received using the dedicated data bus configured between the ISP and the video core and/or the display core (or individual buses between these components).

During the transmission of data to the video core and/or the display core, the ISP can further determine whether a backpressure is received from the video core and/or the display core (conditional block 712). For example, if the rate of transmitting processed data from the ISP to a video core/display core is greater than a processing rate of the video core/display core, the video core/display core can apply backpressure to the ISP. In this implementation, if such backpressure is experienced (conditional block 712, "yes" leg), the ISP pauses the transmission of processed data (block 714), till the backpressure is lifted. However, the transmission of processed imaging data from the ISP to the requesting components continues (block 706), if no backpressure is received from either the video core or the display core (conditional block 712, "no" leg).

In an implementation, the backpressure can be received in the form a stalling request issued by a video core and/or the display core. When such a stalling request is received, the ISP is configured to pause transmission of data to the requesting circuitry (video core or display core) until the backpressure is lifted (e.g., a next data acquisition request is received). In one implementation, the stalling request can be transmitted to the ISP by the requesting circuitry, using the dedicated data bus.

It should be emphasized that the above-described implementations are non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:

an image signal processing (ISP) core comprising circuitry configured to receive image data;

wherein responsive to a first mode of operation, at least one of a video core and a display core is configured to receive the image data directly from the ISP core via a bus that bypasses a memory device; and wherein responsive to a second mode of operation, at least one of the video core and the display core is configured to receive the image data from the memory device instead of via the bus.

2. The system as recited in claim 1, further comprising circuitry configured to select one of the first mode of operation and the second mode of operation based on one or more operating conditions comprising at least one of a latency requirement, a power-consumption state, or an availability of the at least one of the video core and the display core.

3. The system as claimed in claim 1, wherein responsive to the first mode of operation, at least one of the video core and the display core is configured to receive the image data as scaler output at least in part comprising scaled image data.

4. The system as claimed in claim 1, wherein in the first mode of operation, transmission of the image data from the ISP core to the at least one of the video core and the display core is pausable responsive to a stalling condition associated with the at least one of the video core and the display core.

5. The system as claimed in claim 1, wherein the ISP core is configured to transmit the image data to both the video core and the display core concurrently in the first mode of operation.

6. The system as claimed in claim 1, wherein the ISP core is configured to transmit the image data to at least one of the video core and the display core concurrently.

7. The system as claimed in claim 2, wherein the circuitry configured to select the first mode of operation or the second mode of operation comprises mode-selection logic integrated with at least one of the ISP core, the video core, or the display core, the logic being configured to perform dynamic switching between the modes during continuous image capture.

8. A method comprising:

receiving, by circuitry of an image signal processing (ISP) core, image data;

receiving, responsive to a first mode of operation, by at least one of a video core and a display core, the received image data via a bus that bypasses a memory device; and receiving, responsive to a second mode of operation, by at least one of the video core and the display core, the image data from the memory device instead of via the bus.

9. The method as claimed in claim 8, further comprising selecting one of the first mode of operation and the second mode of operation based on one or more operating conditions comprising at least one of a latency requirement, a power- consumption state, or an availability of the at least one of the video core and the display core.

10. The method as claimed in claim 8, further comprising receiving, by at least one of the video core and the display core in the first mode of operation, the image data as scaler output at least in part comprising scaled image data.

11. The method as claimed in claim 8, further comprising receiving, by at least one of the video core and the display core in the first mode of operation, the image data directly from the ISP core via the bus, responsive to a data acquisition request issued by the at least one of the video core and display core.

12. The method as claimed in claim 11, further comprising pausing, by the ISP core, transmission of the image data to at least one of the video core and the display core, responsive to a stalling request issued by at least one of the video core and the display core.

13. The method as claimed in claim 8, further comprising transmitting the image data to both the video core and the display core concurrently.

14. The method as claimed in claim 8, further comprising transmitting, by the ISP core, the image data to at least one of the video core and the display core in a specific order, such that the of the image data matches an order corresponding to an input of at least one of the video core and the display core.

15. A system comprising:

an image signal processing (ISP) core comprising circuitry configured to receive image data;

at least one data bus coupled to the ISP core and to each of a video core and a display core, the at least one data bus being configured to provide a data path that bypasses a memory device; and wherein, in a first mode of operation, the ISP core comprises circuitry configured to transmit the image data concurrently to both the video core and the display core via the at least one data bus, each of the video core and the display core being configured to process the image data independently.

16. The system as recited in claim 15, wherein responsive to a second mode of operation:

the ISP is configured to transmit received image data to a memory device; and at least one of the video core and the display core is configured to retrieve the image data from the memory device instead of the at least one data bus.

17. The system as claimed in claim 15, wherein, in the first mode of operation, at least one of the video core and the display core is configured to receive the image data as scaler output at least in part comprising scaled image data.

18. The system as claimed in claim 15, wherein in the first mode of operation, at least one of the video core and the display core is configured to receive the image data directly from the ISP via the bus, responsive to a data acquisition request issued by the at least one of the video core and display core.

19. The system as claimed in claim 18, wherein in the first mode of operation, transmission of the image data from the ISP core to at least one of the video core and the display core is paused, responsive to a stalling request issued by at least one of the video core and the display core.

20. The system as claimed in claim 15, wherein the ISP core is configured to transmit the image data to at least one of the video core and the display core concurrently.

* * * * *